May 1, 1962 N. NEBOUT 3,032,093
TIRE MANUFACTURE APPARATUS
Filed March 3, 1958 7 Sheets-Sheet 1

Inventor
Noel Nebout

N. NEBOUT

3,032,093

TIRE MANUFACTURE APPARATUS

Filed March 3, 1958

May 1, 1962 N. NEBOUT 3,032,093
TIRE MANUFACTURE APPARATUS
Filed March 3, 1958 7 Sheets-Sheet 5

United States Patent Office 3,032,093
Patented May 1, 1962

3,032,093
TIRE MANUFACTURE APPARATUS
Noël Nebout, Montluçon, Allier, France, assignor, by mesne assignments, to Dunlop Rubber Company Limited, London, England
Filed Mar. 3, 1958, Ser. No. 718,664
Claims priority, application France Mar. 21, 1957
11 Claims. (Cl. 156—402)

This invention relates to apparatus for producing pneumatic tire casings, especially in connection with the means used for positioning the steel wires in such casings.

A process of manufacturing tire casings comprises as a first step, wrapping one or more plies of rubberized fabric, usually two plies, around the periphery of a shaping drum or form. Then steel wires, preliminarily encased in similar rubberized fabric or the like, are applied over the ends of the plies and the end portions of the plies are lifted over the wires and turned down inwards on the drum periphery. Additional plies may then in some cases be applied about the inner plies and folded over the beads formed by the wires.

Heretofore the above described operations were either performed manually and constituted a tedious and difficult process conductive to finished tire products of non-uniform characteristics, or they were carried in a semi-mechanical manner by means of rollers arranged to ride over the periphery of the shaping drum while the drum was rotated. Such roller systems however are apt to damage the plies and frequently produce undesirable folds longitudinally of the drum in the folded-over portions of the plies, resulting in unsatisfactory tire products.

It is therefore an object of this invention to provide automatic apparatus whereby the steps of insertion of the wires and bending the plies thereover are carried out smoothly and regularly to provide uniformly satisfactory finished tire casings with a minimum amount of labor and at an increased production rate.

Apparatus according to my invention essentially comprises, positioned on each side of the tire shaping drum or form, a circular member adapted to receive the wires therearound and to apply said wires over the end ply sections folded over the edges of the drum, and a continuous peripheral annular array of rollers displaceable both axially and radially at the ends of the shaping drum to fold the plies around the wires with the drum being retained in a stationary condition throughout the aforementioned steps.

Desirably the rollers are supported by a set of spring-mounted levers, and power means such as pressure fluid actuators are provided for actuating both the aforementioned circular wire-handling member and the set of roller supporting levers in accordance with a predetermined operational sequence.

In one embodiment, the rollers are mounted in pairs on rocking arms pivoted on swivels or the like, whereby each pair of rollers will be capable of assuming a certain degree of angling which will make allowance for a reasonable amount of dimensional non-uniformity in the plies. Preferably, that portion of the apparatus positioned on one side of the shaping drum is retractible to facilitate removal of the finished tire casings.

An exemplary embodiment of apparatus according to the invention will now be described for purposes of illustration but not limitation with reference to the accompanying drawings wherein:

FIGS. 1 to 10 are diagrammatic views illustrating the respective operational steps involved in positioning the wires and folding the plies around the latter;

Referring first to FIGS. 1 to 10, successive steps in the process of positioning the steel wires and folding down the plies over them will first be described.

A first pair of plies 1 and 2 are first positioned around the shaper drum 3, and the ends 4 of the plies are folded radially inwards so that said ends are applied over the end surfaces 3a of drum 3. This operation can be carried out manually or it may be performed with any suitable mechanical means of conventional type forming no part of the present invention. Furthermore, in an operation that may be performed concurrently with the preceding operation, the wires 5 encased in strips 6 of ply fabric are positioned around an inner annular flange 8 of an annular member 7 coaxial with and equal in diameter to that of the drum. Means to be later described are provided for supporting the annular member 7 coaxially with the drum for axial displacement towards and away from the drum.

It is further noted at this point that prior to the time that the plies were folded over as just described, a set of rollers 9, to be described later, which set forms a continuous annulus along the internal periphery of the drum and resiliently applied against said periphery by spring mounted levers such as 10, has been inserted into the drum so that said levers are applied against the inner periphery thereof by the spring pressed levers 10. The condition of the system just described is illustrated in FIG. 1.

The annular wire supporting member 7 is then advanced towards the drum so as to apply the wires against the depending portion 4 of the plies, as shown in FIG. 2. It will be understood that the plies 1 and 2 and the ply strip 6 encasing the wires are rubberized or gum-coated, so that the wires will be adhesively bonded to the plies when thus applied thereagainst.

The annular member 7 is then retracted away from the drum, as shown in FIG. 3, and simultaneously the rollers 9 are moved axially outwards along the inner drum periphery as will be apparent from that figure so that the rollers engage the inner surface of the plies 4 and push said plies axially outwards under the wires.

The outward movement of rollers 9 is continued until the rollers have been completely withdrawn out of the drum and have sprung radially outward under the biassing action of the spring-pressed levers 10 to a position, as shown in FIG. 4, where said rollers are applying the plies 4 axially against the outer surfaces of the wires 5. The rollers are moved radially outwards a further short distance and are then moved back axially of the drum in the reverse direction over the outer periphery of the drum, as shown in FIG. 5, so as to fold the outer end portions of the plies 4 down over the main portions of said plies. Thereafter the rollers are lifted off the periphery of the drum and are moved axially to positions beyond the rightward end of the drum. In cases where the tire casing is to comprise only two plies or layers the process is now completed.

However, if the tire casing is to be provided with additional layers or plies the process may be continued in the manner now to be described with reference to FIGS. 6 to 10.

Figure 6:
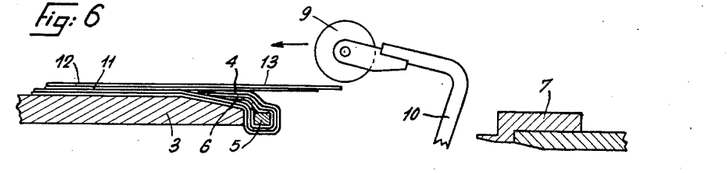
Figure 7:
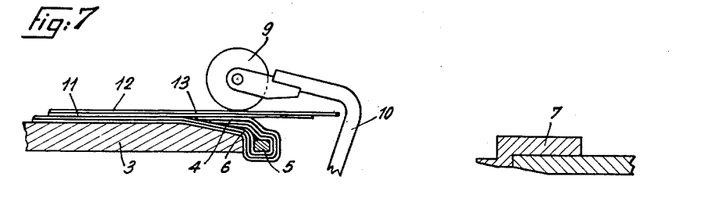
Figure 8:
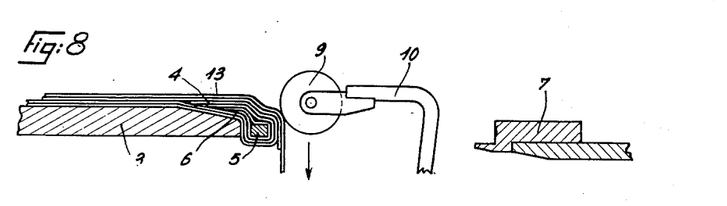

The desired additional plies, e.g. the two additional plies 11 and 12 are positioned on the periphery of the shaping drum and the rollers 9 are advanced leftward from their retracted positions, over the plies 11 and 12 as shown in FIG. 6. The rollers are simultaneously moved radially inwards to press down over the end portions of the plies 11 and 12, as shown in FIG. 7. Thereafter they are moved axially outwards, as in FIG. 8, to press down said end portions against the bead enclosing the wire 5.

Figure 9:
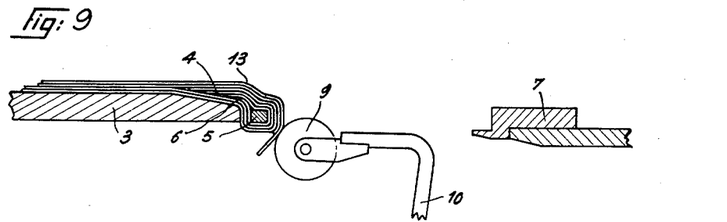
Figure 10:
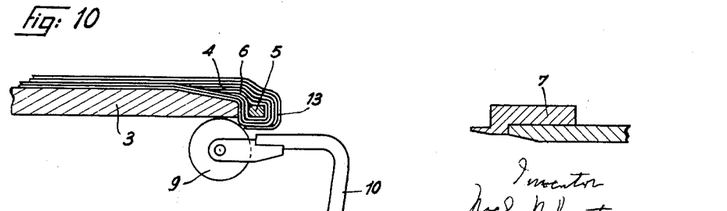

After the rollers have moved past the bead, they are moved radially inwards a further amount, as shown in FIG. 9, then advanced in the reverse or leftward direction to make them ride over the inner surface of the bead and inwards into the drum, see FIG. 10. The process is now completed and the rollers may be returned to the initial positions of FIG. 1.

Means will now be described with reference to FIGS. 11 to 19 whereby the above sequence of operations can be accomplished in an automatic manner. As clearly shown in FIGS. 18 and 19, the apparatus essentially comprises a shaft 14 journalled coaxially with the shaping drum 3 at either or each side of it. The shaft 14 may if desired be formed as an internal extension of the shaft on which the drum 3 is mounted.

Slidably mounted on the shaft 14 is a sleeve 15 (see FIG. 11) having a cylindrical flanged casing 16 secured thereto, said casing including a cylindrical wall directed towards the drum 3, and the free end of said wall having secured thereto the annular wire supporting member 7 previously described.

Figure 13:
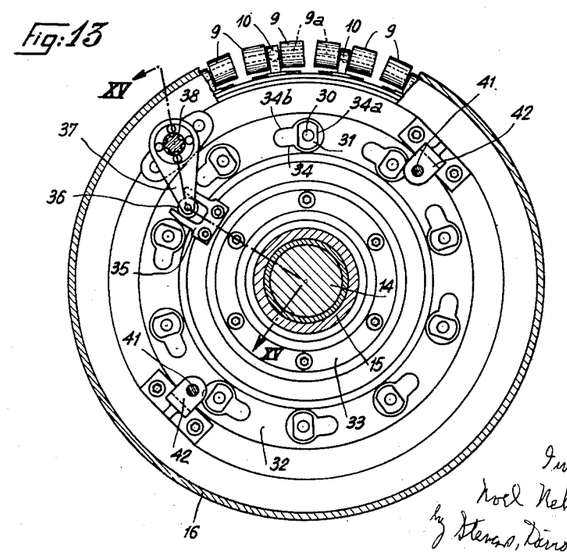
FIG. 13 is a section on line XIII—XIII of FIG. 11.

A pressure fluid actuator 17 (FIGS. 18 and 19) later described in detail, is provided for axially displacing the casing 16 towards and away from the drum, said casing being so mounted as to retain a fixed angular position in space during such axial displacement. A further sleeve 18 slidably surrounds the sleeve 15 and carries a radial annulus or flange 19 secured thereto as with screws. Pivoted to flange 19 at angularly spaced points 20 around it are the one ends of a set of levers 21, having their other ends projecting towards the drum 3. Tension springs 22 have their one ends anchored to the free ends of the projecting arms of levers 21 and all the inner ends of the springs are anchored to a ring member 23 having a screw threaded internal periphery adjustable in position on a threaded portion of the sleeve 18. The projecting end of each lever 21 has further pivoted to it, at a point spaced radially outwards of the anchor point of spring 22, one end of a further bent lever 10 extending generally in a radially outward direction away from shaft 14 and axially away from casing 16. Swivelled on the outer end of lever 10, as shown in FIG. 13, on a ball and socket joint or equivalent swivelling device, is a generally transverse shaft 9a which projects to opposite sides from the lever 10 and has a roller 9 journalled on each projecting end of it. A compression spring 24 is adjustably mounted between the levers 10 and 21 to press the rollers 9 in a radially outward direction. As is clearly shown in FIG. 13, the pairs of rollers 9 constitute a continuous annular array in front of the casing 16.

Each pair of adjacent levers 21 has a yoke 25 pivoted to both levers of the pair, and pivoted to each yoke 25 is a link 26 which projects away from the levers 21 and has its free end connected by way of a ball-and-socket swivel joint 27 to the piston element 28 of a pressure-fluid actuator unit which includes a cylinder 29 pivoted to the flange 19. It will be understood that in the present form of construction, in which there are shown forty rollers 9, there will accordingly be provided twenty sets of levers 21 and 10, and hence ten actuator units such as 29.

Figure 11:
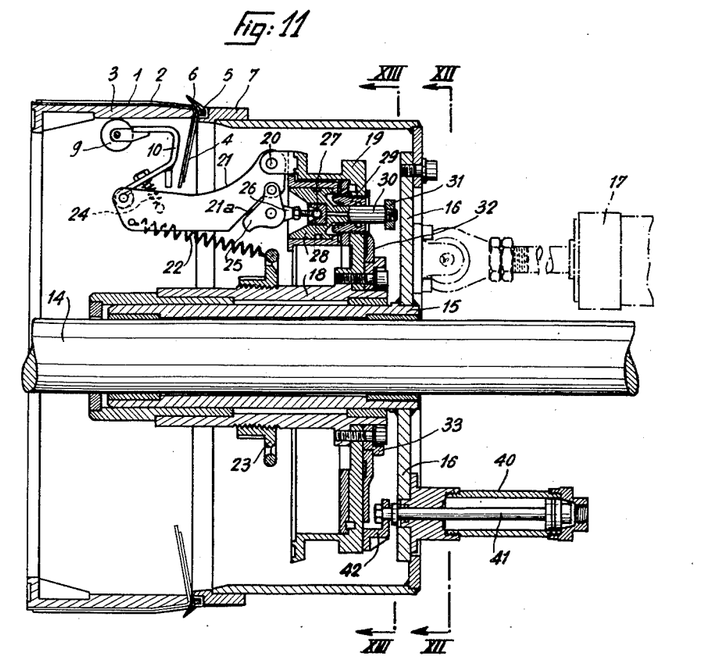
FIG. 11 is an axial section on line XI—XI of FIG. 12 of one construction of apparatus of the invention.
Figure 12:
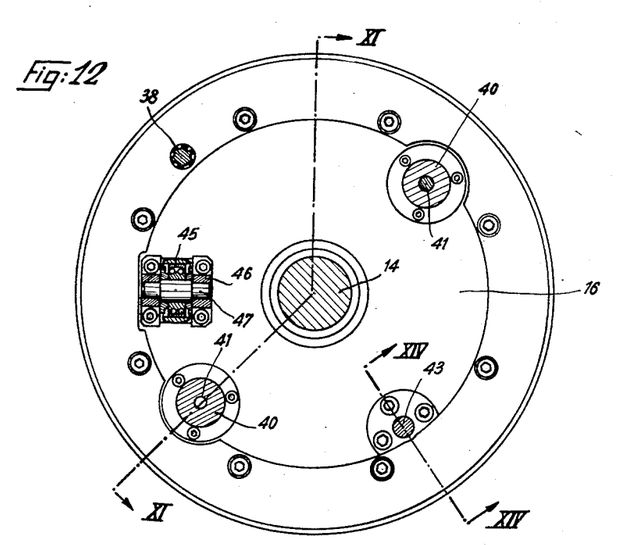
FIG. 12 is a section on line XII—XII of FIG. 11.

The yokes 25 have projecting portions cooperating with abutments 21a provided on the levers 21, so that the application of pressure fluid to the actuator cylinders 29 will act by way of the yokes 25 to rotate the levers 21 in a clockwise direction (as seen in FIG. 11) about the pivots 20 in opposition to the springs 22 thereby tending to push all the sets of rollers 9 radially outwards.

The pistons 28 have piston rods 30 projecting rearwardly therefrom and an abutment member 31 secured on the rear end of each rod 30 cooperates with an adjustable stop surface 32 on flange 19 to permit adjustment of the amount of displacement of the actuators and hence the maximum radial spacing of all the rollers 9 from the axis of shaft 14. As will be seen from FIGS. 13 and 15, the stop surface 32 is provided by a common ring member rotatably mounted at the rear of flange 19 upon an annular bearing surface 33 secured to said flange. The ring member 32 is formed opposite to each piston rod such as 30 with a slot 34 (see FIG. 13) having two portions, one enlarged portion 34a adapted to allow the abutment member 31 to pass freely through it and a narrower portion 34b through which the member 31 cannot pass. It will be understood that different forms of cooperating abutment members and slots might be provided if a larger number of angular settings is desired as will presently appear; thus the abutment members 32 may be provided with stepped aperture sections of different diameters.

Secured to the ring member 32 is a radially outwardly projecting fork member 35 between the tines of which a roller 36 is engaged, said roller being journalled on the end of a lever arm 37 secured on a splined shaft 38. The shaft 38 can be rotatably adjusted, as by means of slide-block 39 splined thereon (see FIG. 15), to impart angular displacements to the ring 32, thereby adjusting the angular setting of said ring with respect to the set of abutment heads 31 and hence adjusting the total stroke of all the actuators 29.

As shown in FIG. 11, a set of further fluid actuator cylinders 40 are secured to the casing 16 and extend axially therefrom in the direction away from the shaper drum 3. Slidable in the cylinders 40 are pistons having piston rods 41 projecting therefrom into operative engagement with arms 42 secured to the rear side of the flange 19 (see FIGS. 11 to 13). Thus application of pressure fluid to the actuators 40 will permit displacing the slidable sleeve 18 together with the various components described.

Figure 14:
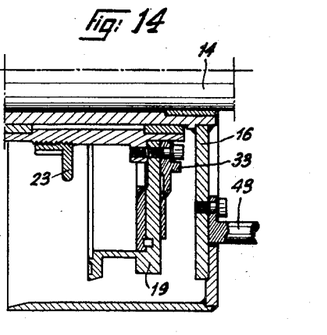
FIG. 14 is a section on line XIV—XIV of FIG. 12.
Figure 15:
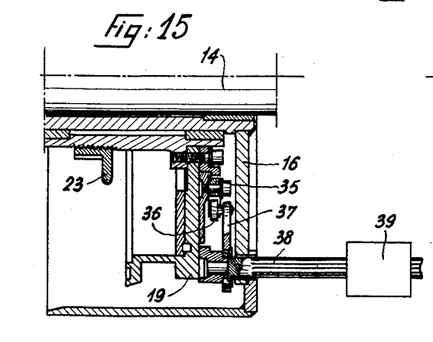
FIG. 15 is a section on line XV—XV of FIG. 13.

A guide rod 43, shown in FIG. 14, prevents rotation of the casing 16 and the components supported therefrom about the axis of shaft 14 during the axial displacements of said casing.

Figure 16:
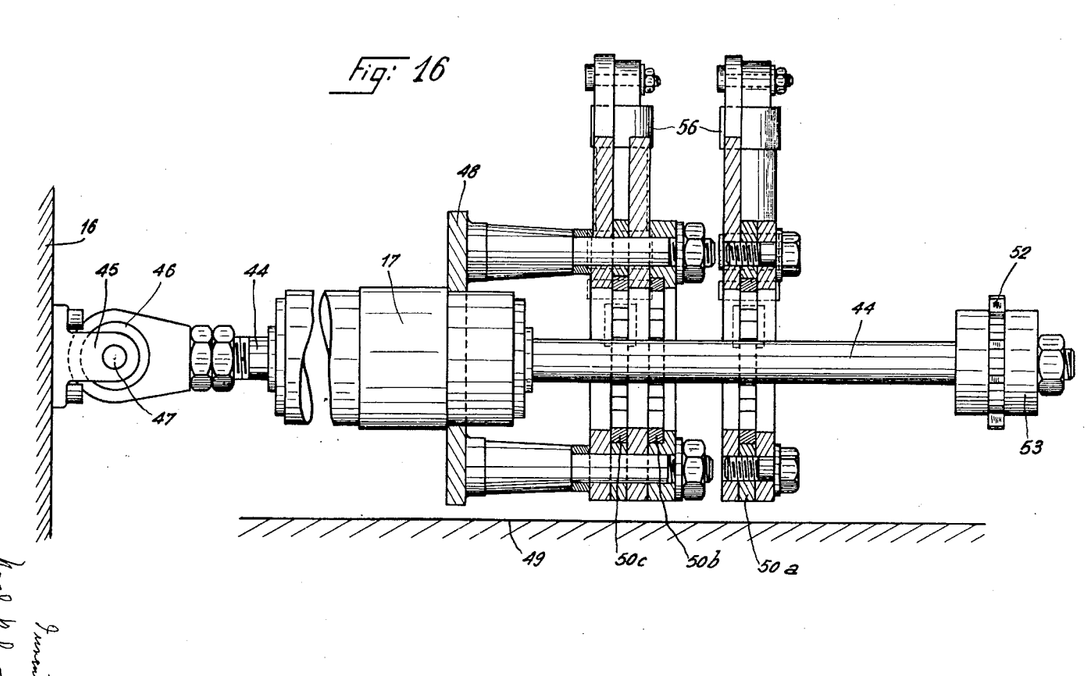
FIG. 16 is a detail view on an enlarged scale illustrating a pressure fluid actuator used in the apparatus, partly in section on line XVI—XVI of FIG. 17.
Figure 17:
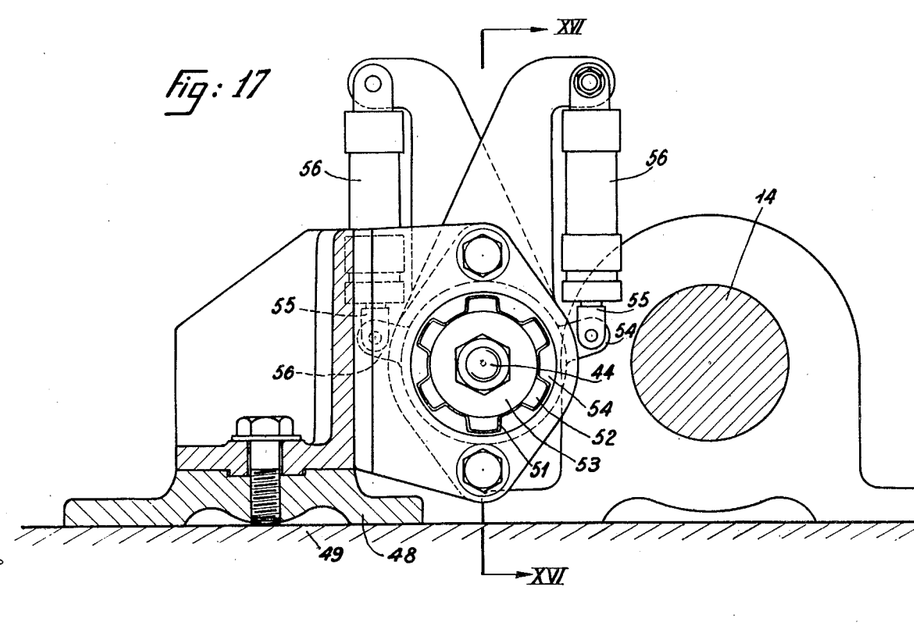
FIG. 17 is a corresponding end view.

As will appear from FIGS. 16 and 17 and as previously mentioned herein, a power actuator 17 serves to displace the casing 16 bodily in an axial direction toward and away from shaper drum 3. This actuator has a piston rod 44 projecting therefrom which is secured at its front end to a clevis 45 journalled by way of ball bearings 46 on a pivot 47 (also see FIG. 12) supported by a bracket from the casing 16. Means are provided for adjusting the displacement of the piston rod 44 of actuator 17 in performing the various steps described hereinabove in connection with FIGS. 1 to 10.

The adjusting means for actuator 17 comprise a support 48 upstanding from a frame 49 and rotatably supporting, as shown in FIGS. 16 and 17, a number of rings, e.g. the three rings 50a, 50b and 50c, coaxially surrounding the actuator rod 44 in axially spaced relation. Each ring is formed with castellations 51 in its inner periphery, engageable with complementary castellations formed on an annulus 52 journalled on a hub 53 secured at the free end of actuator piston rod 44. The annulus 52 can slide freely through each of the rings 50a, 50b, 50c if said rings are angularly set to positions coerresponding to that of the annulus 52, and it will be understood that the angular settings of said rings can be adjusted so as to limit the axial displacement of the rod 44 of actuator 17 to any of a predetermined set of three values. More than three rings can obviously be provided if closer adjustment is desired. To enable ready angular adjustment of each ring, each ring is formed with a radially projecting lug 54 which is pivoted by way of a clevis to the lower end of the piston rod 55 of an actuator 56 the cylinder of which has its upper end pivoted to the frame 48.

It will be understood from the foregoing that by suitably controlling the pressure fluid actuators 17, 29, 40 and 56 and the slideblock 38 through conventional means, not illustrated, the sequence of steps described hereinabove as involved in the process of positioning the wires and folding and bonding the plies thereover can readily be performed for a wide range of different types and sizes of tires.

Figure 18:
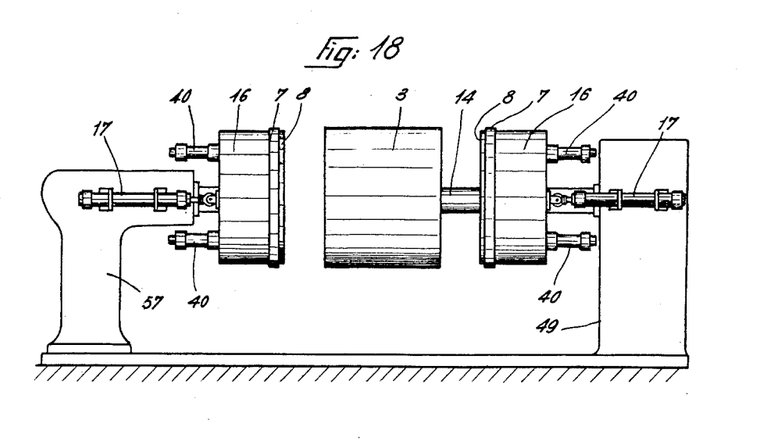
FIG. 18 is a general elevation view of the apparatus.
Figure 19:
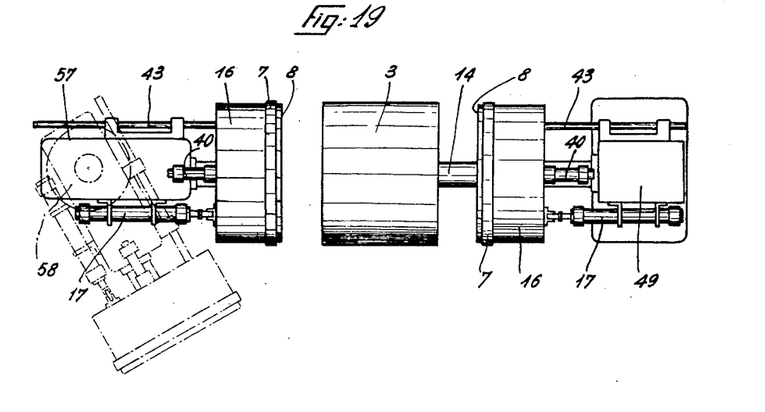
FIG. 19 is a corresponding view in plan.

As shown in FIGS. 18 and 19, two assemblies each generally similar to that described above are mounted one on each side of the shaping drum 3. In the construction shown one assembly is mounted directly upon the extended drum shaft 14 as previously mentioned and is connected by way of guide rod 43 and actuator 17 to the stationary frame 49 in which the end of said shaft 14 is journalled. The opposite assembly is mounted on a frame 57 which is swingable about a vertical pivot (see FIG. 19) between the operative position shown in full lines and a retracted position illustrated in chain lines in which position a finished tire can conveniently be removed from the shaper drum 3.

A wire may be positioned on the flange 8 of annular member 7 prior to the positioning of the plies upon the drum, and at a time when said shaper drum is in its collapsed condition so that the wire can be conveniently passed around it.

It will be understood that various changes and modifications may be made in the various components illustrated and described without exceeding the scope of the present invention as defined by the ensuing claims.

What I claim is:

1. In a tire manufacturing apparatus, in combination with a shaper drum adapted to receive at least one tire ply wrapped therearound, a supporting member mounted for displacement in the direction of the axis of said drum coaxially with said drum, a first annular set of levers pivoted on said member about axes normal to axial planes of said drum, a second annular set of levers respectively pivoted solely on the levers of said first set about axes parallel to the pivoting axes of said first set of levers, resilient means interposed between each lever of said first set and the corresponding lever of said second set, solid surface rollers rotatably supported by the levers of said second set for rotation about axes normal to axial planes of said drum, means for displacing said member in the direction of the axis of said drum, and means for angularly shifting said levers of said first set about their axes whereby the end of said ply may be shaped about said drum.

2. The combination of claim 1 wherein two rollers are mounted about a common axis on each of the levers of said second set of levers, the said axis being mounted on the corresponding lever by means of a universal joint.

3. The combination of claim 1 wherein said first annular set of levers comprises an even number of levers, and having a yoke pivoted to each group of two levers and pressure fluid actuator means interposed between each of said yokes and said supporting member.

4. The combination of claim 3 wherein each said pressure fluid actuator means comprises a cylinder mounted on said supporting member and a piston mounted for reciprocation within said cylinder and connected by a swivel joint to said yoke, said piston having a rod protruding through said supporting member and provided with an abutment member and said supporting member having coaxially mounted thereon an adjustable stop member adapted to cooperate with said abutment member whereby the hub of said piston may be adjusted.

5. The combination of claim 3 wherein resilient means are interposed between said levers of said first annular set and said supporting means.

6. In a tire manufacturing apparatus, in combination with a shaper drum adapted to receive at least one tire ply wrapped therearound, a shaft coaxial with said drum and extending beyond one end thereof, a cylindrical casing mounted on said shaft coaxial with said drum and having an open bead wire supporting end directed towards said drum, means for shifting said cylindrical casing along said shaft for applying a bead wire against a side surface of said ply at one end of the drum, a supporting member mounted within said casing coaxially therewith for axial displacement relatively thereto, a first annular set of levers pivoted on said member about axes normal to axial planes of said drum, a second annular set of levers respectively pivoted solely on the levers of said first set about axes parallel to the pivoting axes of said first set of levers, resilient means interposed between each lever of said first set and the corresponding lever of said second set, solid surface rollers rotatably supported by the levers of said second set for rotation about axes normal to axial planes of said drum, fluid pressure actuator means between said cylindrical casing and said supporting member for axially displacing said member relatively to said casing, and means for angularly shifting said levers of said first set about their axes whereby the end of said ply may be wrapped around said bead wire and shaped about said drum.

7. The combination of claim 6 wherein said means for shifting said cylindrical casing along said shaft comprises a stationary support, a cylinder carried by said support and parallel to said shaft, a hydraulic piston mounted for reciprocation within said cylinder, said piston having a rod projecting on both sides through said cylinder, one end of said rod being pivoted to said casing whereas the other end carries an abutment member, said stationary support carrying a set of angularly adjustable annular abutting means surrounding said rod, each annular abutting means having abutment surfaces abuttingly interposable in the path of said abutment member in one angular position of said annular means and clear of said path in another angular position thereof, and means for selectively altering the angular setting of each of said annular abutting means to determine the maximum displacement of said rod.

8. The combination of claim 7 wherein said means for selectively altering the angular setting of said annular abutting means comprise fluid pressure actuator means carried by said stationary support.

9. In a tire manufacturing apparatus, in combination with a shaper drum adapted to receive at least one tire ply wrapped therearound, a first shaft coaxial with said drum and extending beyond one end thereof, a second shaft coaxial with said drum and located beyond the other end thereof, cylindrical casing coaxially mounted on each of said shafts and having each an open bead wire supporting end directed towards said drum, means for shifting said cylindrical casings along the corresponding shafts for applying a bead wire against the corresponding side surface of said ply at the corresponding end of the drum, a supporting member mounted within each said casing coaxially therewith for axial displacement relatively thereto, a first annular set of levers pivoted on said member about axes normal to axial planes of said drum, a second annular set of levers respectively pivoted solely on the levers of said first set about axes parallel to the pivotal axes of said first set of levers, resilient means interposed between each lever of said first set and the corresponding lever of said second set, solid surface rollers rotatably supported by the levers of said second set for rotation about axes normal to axial planes of said drum, means for angularly shifting said levers of said first set about their axes, fluid pressure actuator means between each said cylindrical casing and the corresponding supporting member for axially displacing said member relatively to said casing, whereby the ends of said ply may be wrapped around said bead wires and shaped about said drum, and means for bodily swinging said second shaft about an axis perpendicular to its own axis into and out of operative relation with the corresponding end of the drum.

10. The combination of claim 9 wherein said drum is mounted on said first shaft.

11. The combination of claim 1 wherein each lever of said second set has a crooked shape with its outer end being directed toward said shaper drum in substantial parallelism with the axis of said drum.

References Cited in the file of this patent

UNITED STATES PATENTS

| | | |
|---|---|---|
| 1,465,552 | Holmes | Aug. 21, 1923 |
| 1,966,541 | Denmire | July 17, 1934 |
| 2,313,035 | Breth | Mar. 9, 1943 |
| 2,319,643 | Sternad | May 18, 1943 |
| 2,409,974 | Breth et al. | Oct. 22, 1946 |
| 2,488,863 | Haase | Nov. 22, 1949 |
| 2,614,952 | Kraft | Oct. 21, 1952 |